United States Patent
Aube et al.

(10) Patent No.: US 7,416,046 B2
(45) Date of Patent: Aug. 26, 2008

(54) MODULAR FRONT HEADLIGHT FOR A THREE-WHEELED VEHICLE

(75) Inventors: Martin Aube, St-Bruno (CA); Guillaume Longpre, Granby (CA); Mathieu Audet, Montreal (CA); Daniel Mercier, Magog (CA)

(73) Assignee: Bombardier Recreational Products Inc., Valcourt (CA)

( * ) Notice: Subject to any disclaimer, the term of this patent is extended or adjusted under 35 U.S.C. 154(b) by 495 days.

(21) Appl. No.: 10/920,214

(22) Filed: Aug. 18, 2004

(65) Prior Publication Data

US 2005/0039967 A1 Feb. 24, 2005

Related U.S. Application Data

(60) Provisional application No. 60/496,918, filed on Aug. 22, 2003.

(51) Int. Cl.
*B62D 21/00* (2006.01)
(52) U.S. Cl. .................................................... 180/312
(58) Field of Classification Search ......... 180/210–215, 180/219, 229, 311, 312; 362/473, 475; 296/78.1, 296/77.1, 180.1
See application file for complete search history.

(56) References Cited

U.S. PATENT DOCUMENTS

| | | | | |
|---|---|---|---|---|
| 5,194,779 | A | * | 3/1993 | Segoshi et al. ................. 315/82 |
| 6,089,738 | A | * | 7/2000 | Ebara .......................... 362/546 |
| 2003/0133308 | A1 | | 7/2003 | Christensen |

OTHER PUBLICATIONS

49 C.F.R. 571.108.
European Council Directive 93/92/EEC of Oct. 29, 1993.
Amendments to European Council Directive 93/92/EEc of Oct. 29, 1993.

* cited by examiner

*Primary Examiner*—Paul N. Dickson
*Assistant Examiner*—Robert A. Coker
(74) *Attorney, Agent, or Firm*—Osler, Hoskin & Harcourt LLP

(57) ABSTRACT

A three-wheeled vehicle for on-road use with a modular front headlight system that complies with both United States and European Community laws is disclosed. The modular system includes a headlight module, an air intake module, and a fairing module.

13 Claims, 7 Drawing Sheets

MODULAR FRONT HEADLIGHT FOR A THREE-WHEELED VEHICLE

CROSS-REFERENCE TO RELATED APPLICATIONS

This application claims priority to the following U.S. Provisional Patent Application No. 60/496,918, filed Aug. 22, 2003 and Titled "Modular front headlights for a three-wheeled vehicle".

This application is related to, but does not claim priority to the following commonly owned pending U.S. patent application Ser. No. 10/371,224, commonly owned pending U.S. patent application Ser. No. 10/371,227, commonly owned pending U.S. patent application Ser. No. 10/371,230, commonly owned pending U.S. patent application Ser. No. 10/371,232, and commonly owned pending U.S. patent application Ser. No. 10/371,233, which were filed on Feb. 24, 2003. The entirety of the subject matter of these applications is incorporated by reference herein.

This application is also related to, but does not claim priority to commonly owned pending U.S. Design application Ser. No. 29/155,964 filed on Feb. 22, 2002, and common owned pending U.S. Design application Ser. No. 29/156,028 filed on Feb. 23, 2003. The entirety of the subject matter of these applications is incorporated by reference herein.

This application is also related to, but does not claim priority to commonly owned pending U.S. patent application Ser. No. 10/346,188 and U.S. patent application Ser. No. 10/346,189 which were filed on Jan. 17, 2003. The entirety of the subject matter of these applications is incorporated by reference herein.

BACKGROUND OF THE INVENTION

1. Field of the Invention

The present invention relates generally to a three-wheeled vehicle designed for road use, and specifically to modular front headlights for a three-wheeled vehicle designed for road use.

2. Description of Related Art

Regulations concerning the placement of headlights on two and three-wheel motor vehicles may be different depending on the country issuing the regulation. For example, the regulation governing the placement of headlights on motorcycles in the United States, issued by the National Highway Traffic Safety Administration, is different than the directive issued by the European Council governing the placement of headlights on two and three-wheeled motor vehicles in the European Community.

Specifically, in the United States, 37 C.F.R. §571.108, which is attached in the Appendix and is incorporated herein by reference in its entirety, governs lamps, reflective devices, and associated equipment for motor vehicles. Three-wheeled vehicles appear to be governed by the same rules that govern motorcycles. The rules require a headlight system containing a single headlamp to be mounted on the vertical centerline of the motorcycle and a headlight system containing more than one light source to be mounted either on the vertical centerline or horizontally disposed about the vertical centerline. If the light sources are horizontally disposed about the vertical centerline, the distance between the closest edges of the effective projected luminous lens area must not be greater than 8 inches (200 mm) 120. Also, the centerline of the headlamp must be between 22 inches (559 mm) and 54 inches (1372 mm) 122 above the road surface. A schematic summary of the laws of the United States, as they apply to a three-wheeled vehicle of the present invention, is illustrated in FIG. 7.

In contrast, in the European Community, the installation of lighting and light-signaling devices on two or three-wheeled motor vehicles is governed by Council Directive 93/92/EEC of Oct. 29, 1993, which is attached in the Appendix and is incorporated herein by reference in its entirety. Amendments to the Directive are also attached in the Appendix and are incorporated herein be reference in their entirety. The directive requires that three-wheeled vehicles, also referred to as tricycles, with a maximum width exceeding about 51.2 inches (1300 mm) 124 must have two main-beam headlamps and two dipped-beam headlamps. The headlamps may be grouped together with a dipped-beam headlamp and other front lamps. If the headlamp and dipped-beam lamps are grouped together in pairs, the reference centers of the lamps must be symmetrical in relation to the median longitudinal plane of the vehicle. The edges of the illuminating surfaces of the dipped-beam lamps furthermost from the median longitudinal plane of the vehicle must not be more than about 15.7 inches (400 mm) 126 from the outermost edge of the vehicle. The innermost edges of the illuminating surfaces of the dipped-beam headlamps must be at least about 19.7 inches (500 mm) 128 apart. Also, the dipped-beam headlamps must be between about 19.7 inches (500 mm) 130 and about 47.2 inches (1200 mm) 132 above the ground. A schematic summary of the laws of the European Community, as they apply to a three-wheeled vehicle of the present invention, is illustrated in FIG. 8.

Thus, the differences between the United States Regulation and the European Community Directive for headlights make it difficult to provide a single three-wheeled vehicle, with a maximum width exceeding about 51.2 inches (1300 mm) 124, to both the United States and European Community markets.

Also, changing the headlight position after the vehicle has been manufactured may cause problems, particularly with regards to the location of the air intake openings that are provided on the vehicle. The air intake openings provide air to the engine during vehicle operation. Thus, any changes made to the positioning of the headlights may compromise the proper functioning of the engine if air is not properly provided to the engine.

Therefore, there is a need for a three-wheeled vehicle with a modular headlight and air intake system so that a single vehicle may be manufactured and the appropriate headlight configuration provided after the vehicle has been manufactured. There is also a need for a three-wheeled vehicle that can be converted to comply with either the United States or European Community specifications with minimal cost.

SUMMARY OF THE INVENTION

It is therefore an aspect of the present invention to provide a three-wheeled vehicle with a modular headlight system so that a single vehicle model can be manufactured for both the United States and European Community markets.

It is another aspect of the present invention to provide a three-wheeled vehicle with a modular air intake system so that a single vehicle model can be manufactured for both the United States and European Community markets.

It is a further aspect of the present invention to provide a three-wheel vehicle such that the vehicle can be easily converted from a vehicle to be used in the United States to a vehicle to be used in the European Community, and vice-versa.

It is another aspect of the present invention to provides fairing, air intake and light modules.

One other aspect of the present invention provides a fairing module that may be opened thus offering a storage compartment (glove box). The storage compartment can be locked.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS

Figure 1:
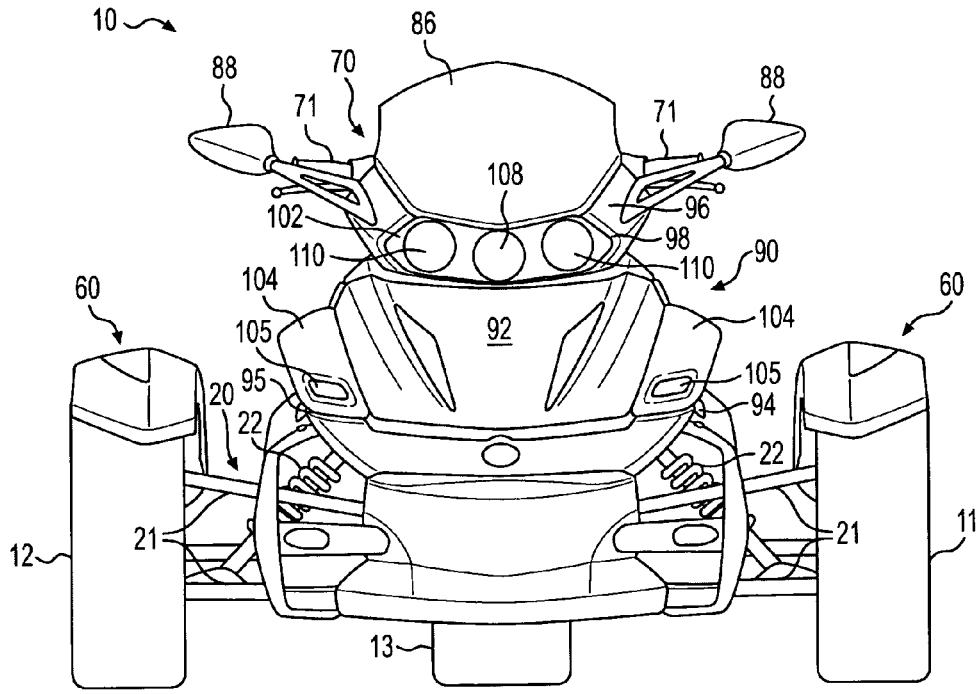
FIG. 1 is a front view of a three-wheeled vehicle of the present invention, in compliance with the laws of the United States.
Figure 2:
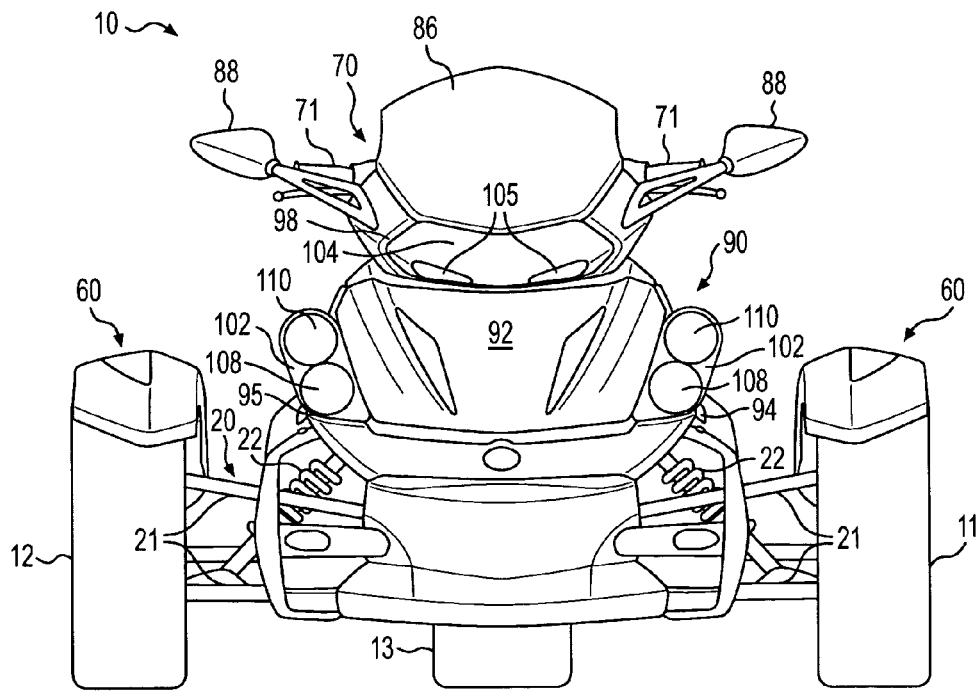
FIG. 2 is a front view of the three-wheeled vehicle of FIG. 1, in compliance with the laws of the European Community.

A three-wheeled straddle type vehicle 10 in accordance with the present invention is generally illustrated in FIGS. 1 and 2. It should be noted that the conventions "left," "right," "front," "rear," "up," "down," "forward," and "rearward" are defined according to the normal, forward travel direction of the vehicle being discussed. As a result, the "left" side of a vehicle corresponds to the left side of a rider seated in a forward-facing position on the vehicle.

As shown in the figures, the vehicle 10 includes a frame assembly 40, a pair of front wheels 11, 12 suspended from a front portion of the frame assembly 40 by a front suspension system 20, a rear wheel 13 suspended from a rear portion of the frame assembly 40 by a rear suspension system 30, an engine 50 mounted to the frame assembly 40, and a steering assembly 70 connected to the front wheels 11, 12. The vehicle 10 also includes a body 90 that is connected to the frame assembly 40 and includes openings configured to receive a plurality of utility modules 100. The specific configuration of the utility modules 100 on the vehicle 10 will depend on the country in which the vehicle 10 will be used, as explained below.

The front wheels 11 and 12 are supported by the front suspension assembly 20. The rear wheel 13 is supported by a rear suspension assembly 30. The front suspension assembly 20 and the rear suspension assembly 30 are secured to the frame assembly 40. As shown in FIGS. 1 and 2, the front suspension assembly 20 includes a pair of suspension support arms (A-arms) 21 and a shock absorber 22 extending from each side of the frame assembly 40 to support the wheels 11 and 12.

As shown in the figures, the vehicle 10 includes a frame assembly 40, a pair of front wheels 11, 12 suspended from a front portion of the frame assembly 40 by a front suspension system 20, a rear wheel 13 suspended from a rear portion of the frame assembly 40 by a rear suspension system 30, an engine 50 mounted to the frame assembly 40, and a steering assembly 70 connected to the front wheels 11, 12. The vehicle 10 also includes a body 90 that is connected to the frame assembly 40 and includes openings configured to receive a plurality of utility modules. The specific configuration of the utility modules on the vehicle 10 will depend on the country in which the vehicle 10 will be used, as explained below.

In accordance with the present invention, each wheel 11, 12, 13 may include one or more rims 14, 15, 16. Each rim 14, 15, 16 accommodates a tire 17, 18, 19 thereon. When multiple rims are provided for a single wheel, a rigid connection exists there between such that the rims and the tires rotate as a single unit. The left and right front wheels 11 and 12 have tires 17, 18 secured thereto, respectively. The rear wheel 13 has one or more tires 19 secured thereto. If the rear wheel 13 has more than one tire 19, the tires are mounted to the rim 16 so that they rotate together. Each of the wheels 11, 12 and 13 is sized to accommodate at least one 15-inch automotive tire. The present invention, however, is not limited to equal sized wheels; rather, it is contemplated that the front wheels 11 and 12 may be smaller in size to accommodate a 13-inch automotive tire. Furthermore, other wheel sizes are considered to be well within the scope of the present invention. The tires 17, 18, 19 are suitable for road use and may be automotive tires, for example.

As illustrated in FIGS. 1-3 and 5, a fender assembly 60 is associated with each of the front wheels 11 and 12. As shown in FIGS. 1 and 2, each fender assembly 60 covers the top rear portion of the tires 14, 15. The fender assembly 60 prevents dirt, water and road debris from being kicked up onto the rider, while the rider operates the vehicle 10. Each fender assembly 60 is linked to the front suspension assembly 20 and a steering assembly 70 such that it moves in connection with the wheels 11 and 12 during steering of the vehicle 10.

Figure 6:
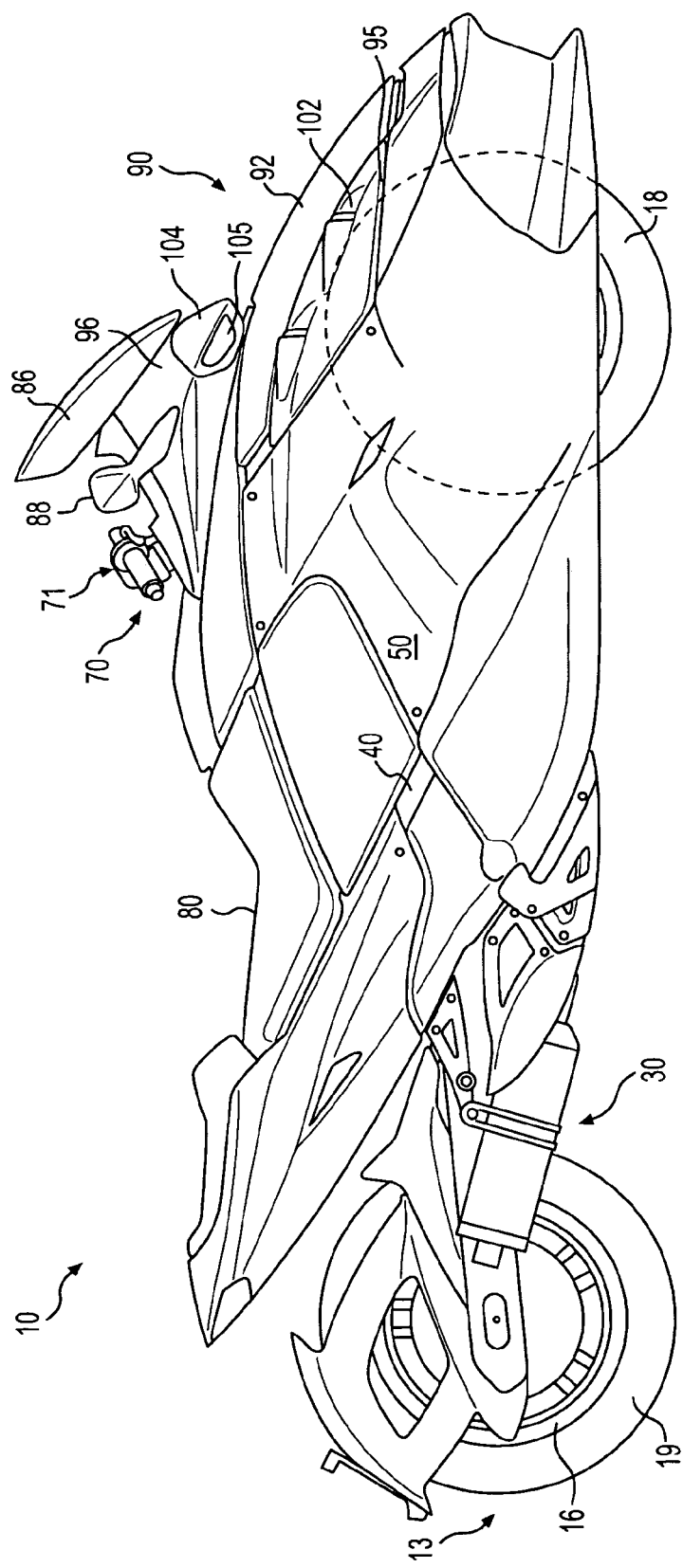
FIG. 6 is a side view of the vehicle of FIG. 5 with the front wheels removed.
Figure 7:
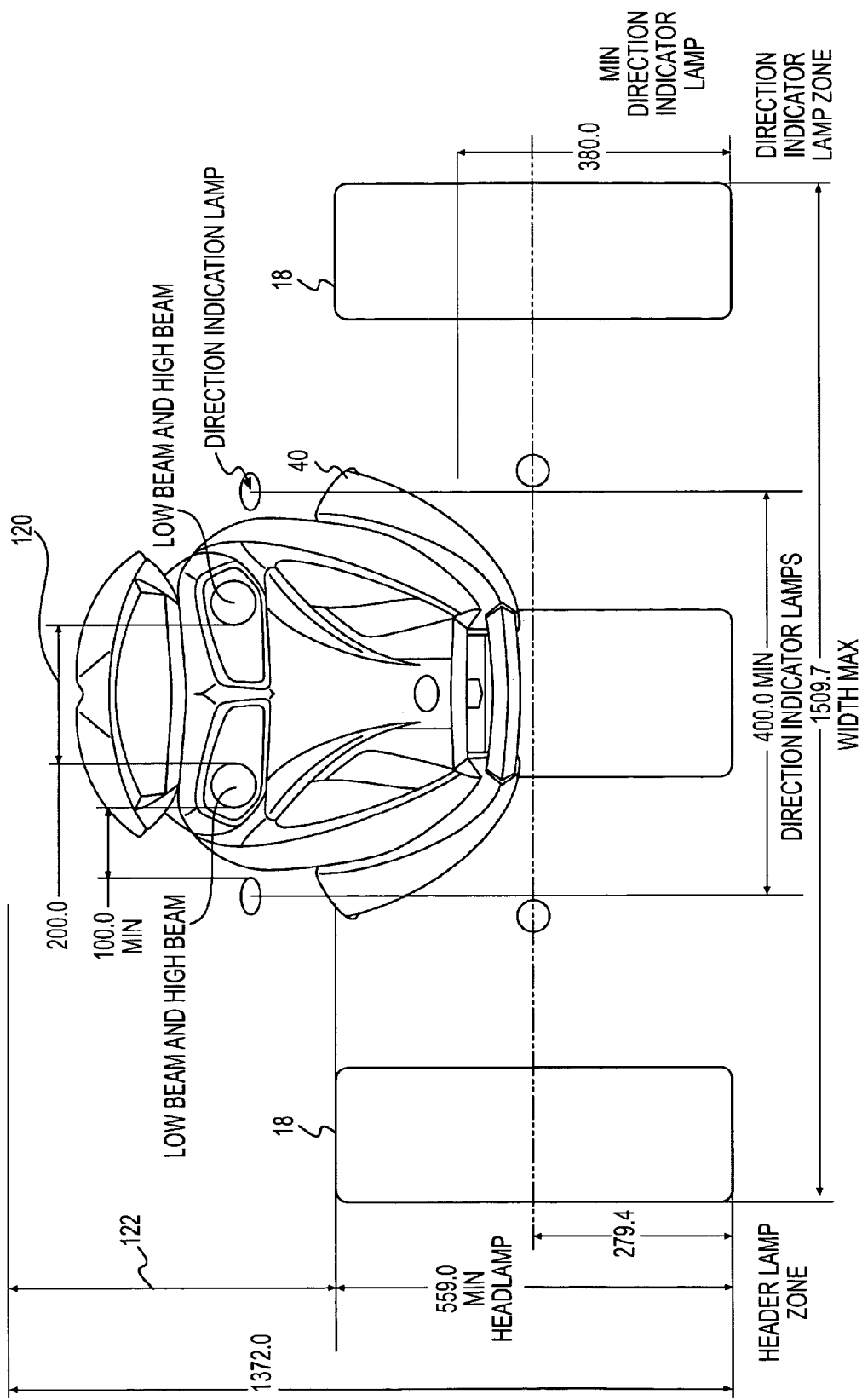
FIG. 7 is a schematic summary of the laws of the United States regarding the placement of lights on the vehicle of the present invention.
Figure 8:
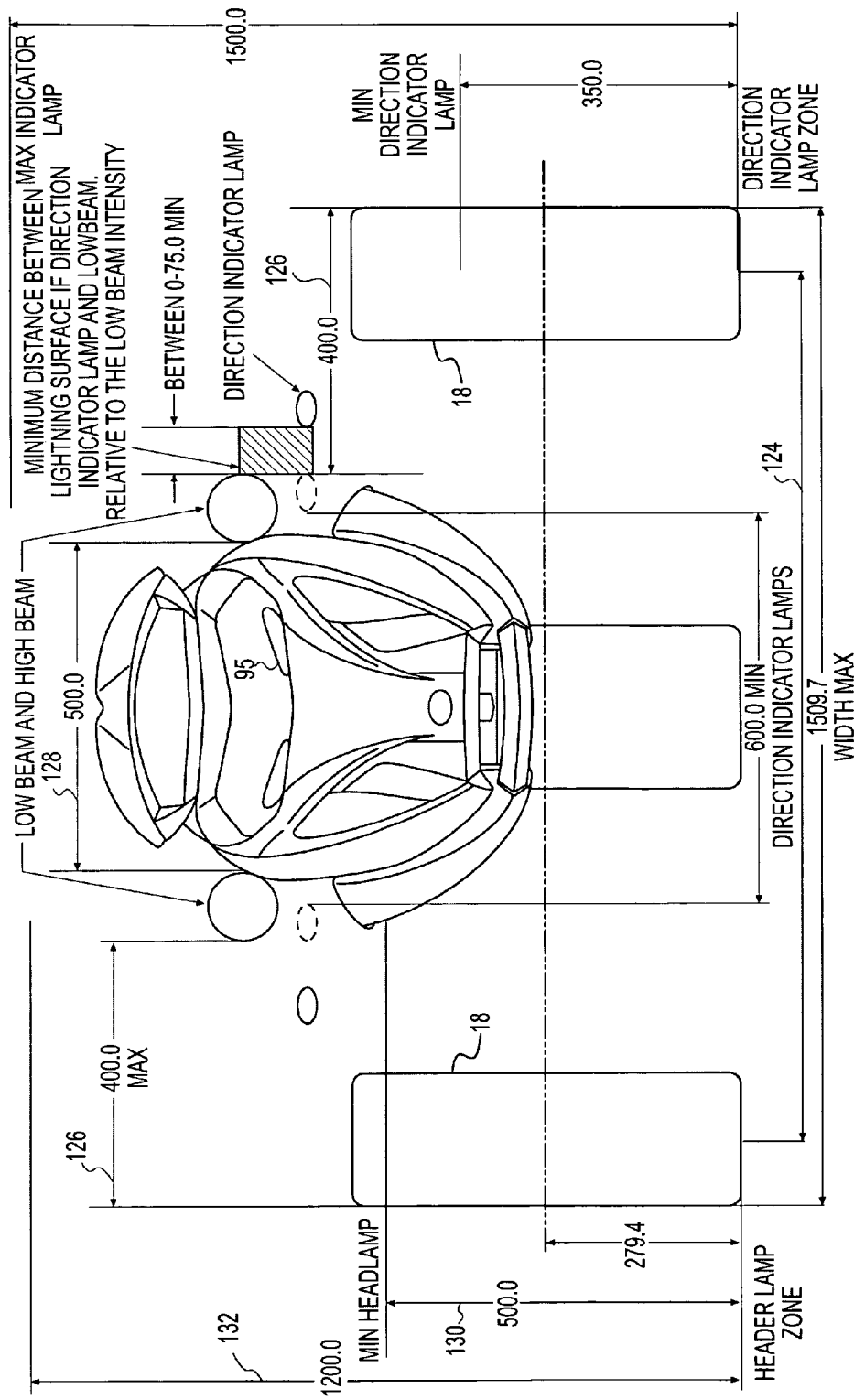
FIG. 8 is a schematic summary of the laws of the European Community regarding the placement of lights on the vehicle of the present invention.

The engine 50 is secured to the vehicle frame assembly 40 through the engine cradle assembly 45, and may be secured directly to the frame assembly 40 at several points of attachment, as illustrated in FIG. 6. The engine 50 is supported just behind the front suspension assembly 20 just above the bottom of the frame assembly 40. This positioning provides a lower center of gravity, which is useful for ensuring good handling and stability of the vehicle 10.

The engine 50 is operatively connected to the rear wheel 13 to power the vehicle 10. The engine 50 could alternatively be connected to the front wheels 11, 12 so that the vehicle 10 is a front-wheel drive vehicle. Alternatively, the engine 50 could be operatively connected to all three wheels 11, 12, 13 such that the vehicle operates using all-wheel drive.

The engine 50 is preferably a four stroke internal combustion engine, but may also be a two stroke engine. Because of the rigidity and structural strength of the frame assembly 40, the engine 50 can generate an output power of 80-135 horsepower or more. The frame assembly 40 provides sufficient structural rigidity to withstand the forces created during high performance operation of the vehicle 10. A 1000 cc v-type internal combustion engine manufactured by ROTAX® of Austria is preferred. The vehicle 10 in accordance with the present invention, however, is not limited to a 1000 cc engine. It is contemplated that a 600 cc two-stroke engine may also be used. Furthermore, other engine displacement sizes are considered to be well within the scope of the present invention. It is further contemplated that the engine 50 may have a continuously variable transmission (CVT) or a manual transmission.

Still further, it is contemplated that any power source that is capable of powering the vehicle may be used. Such alternative power sources may include one or more fuel cells, or any other electric or hybrid power source.

The steering of the front wheels 11 and 12 is accomplished through the use of the steering assembly 70. The steering assembly 70 includes handlebars 71 and steering linkages (not shown) connected to the wheels 11 and 12 for purposes of turning the wheels 11 and 12 in response to movement of the handlebars 71. The steering assembly 70 of the vehicle 10 is preferably provided with a progressive steering system (not shown). The progressive steering system allows the handlebars 71 to be turned to their maximum position (about 50 degrees of arc), while the wheels 11 and 12 turn to an increasingly greater extent. The linkage between the handle bars 71 and the steering linkages (not shown) that makes progressive steering possible is designed so that small variations in the handlebars 71 when the vehicle is traveling straight will not turn the wheels to any significant degree. In other words, when the vehicle 10 is traveling forward, especially at high speed, there should be a good amount of play in the handlebars 71 so that small movements made by the driver do not result in a sudden (or unexpected) turning of the vehicle 10. On the other hand, when the handlebars 71 are turned to a more significant displacement, the degree of play preferably should decrease as the angular displacement of the handlebars 71 increases. In other words, the closer the handlebars 71 are turned to their most rotated position, the less play there should be in the linkage between the handlebars 71 and the wheels 11 and 12 of the vehicle 10. This progressive steering system along with other types of progressive steering systems that may alternatively be used with the steering assembly 50 are disclosed in commonly owned pending U.S. patent application Ser. No. 10/371,227, titled "Progressive Steering System," filed on Feb. 24, 2003, which is specifically incorporated herein by reference.

Figure 3:
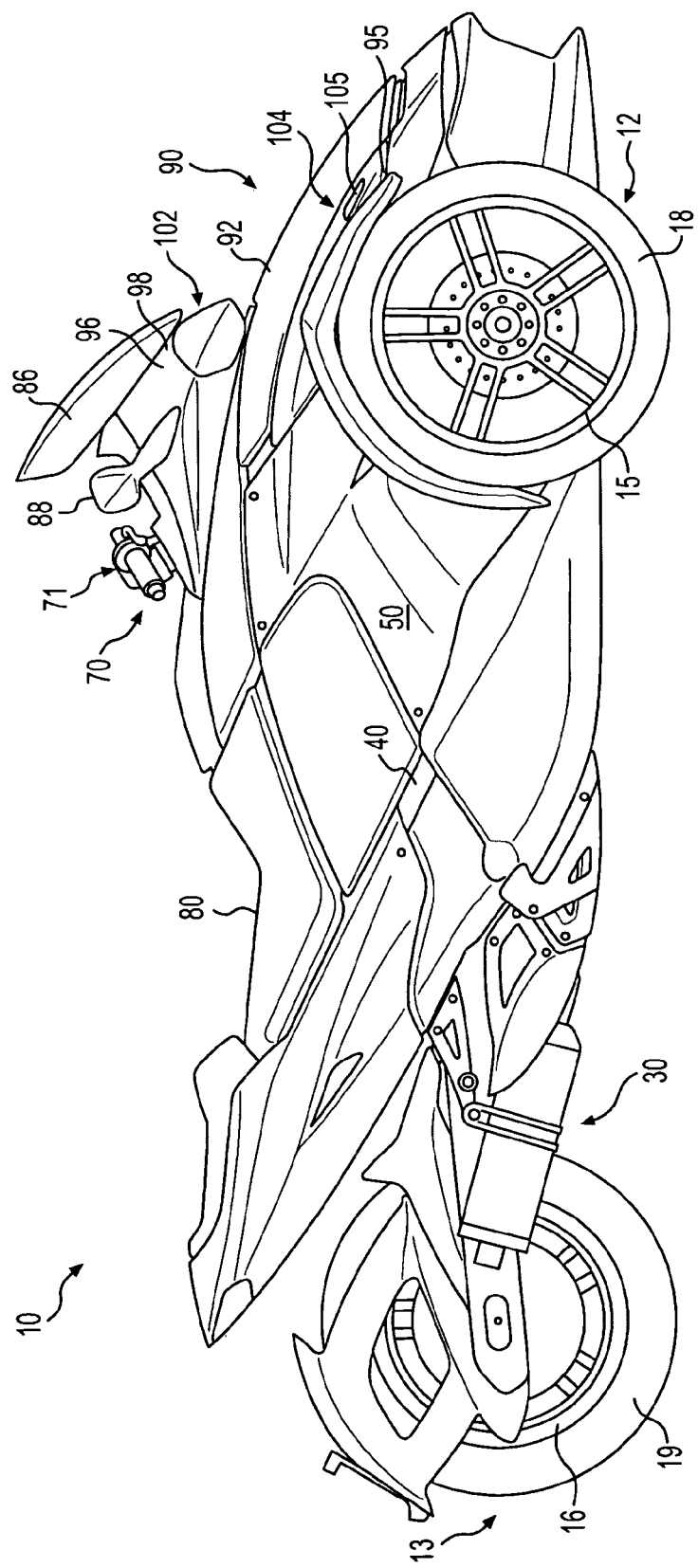
FIG. 3 is a side view of the vehicle of FIG. 1.
Figure 4:
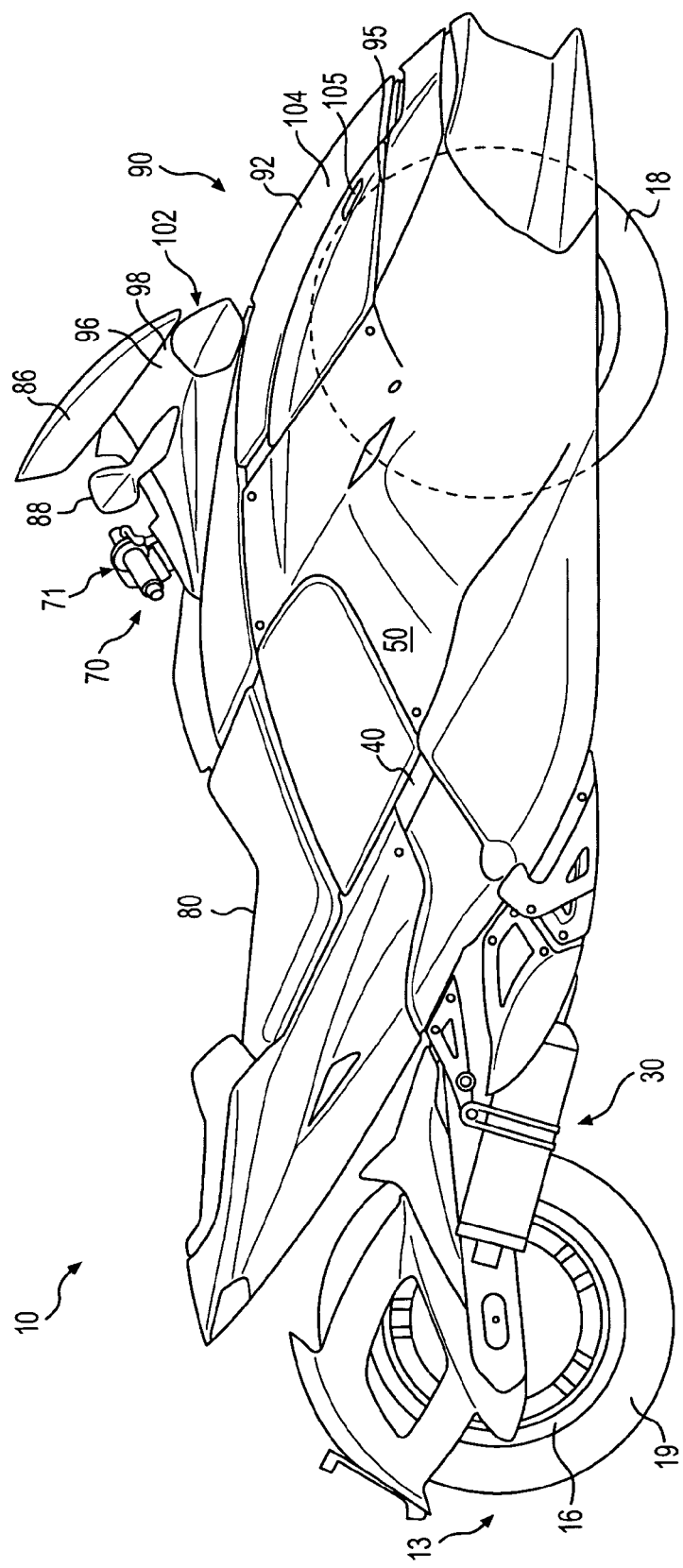
FIG. 4 is a side view of the vehicle of FIG. 3 with the front wheels removed.
Figure 5:
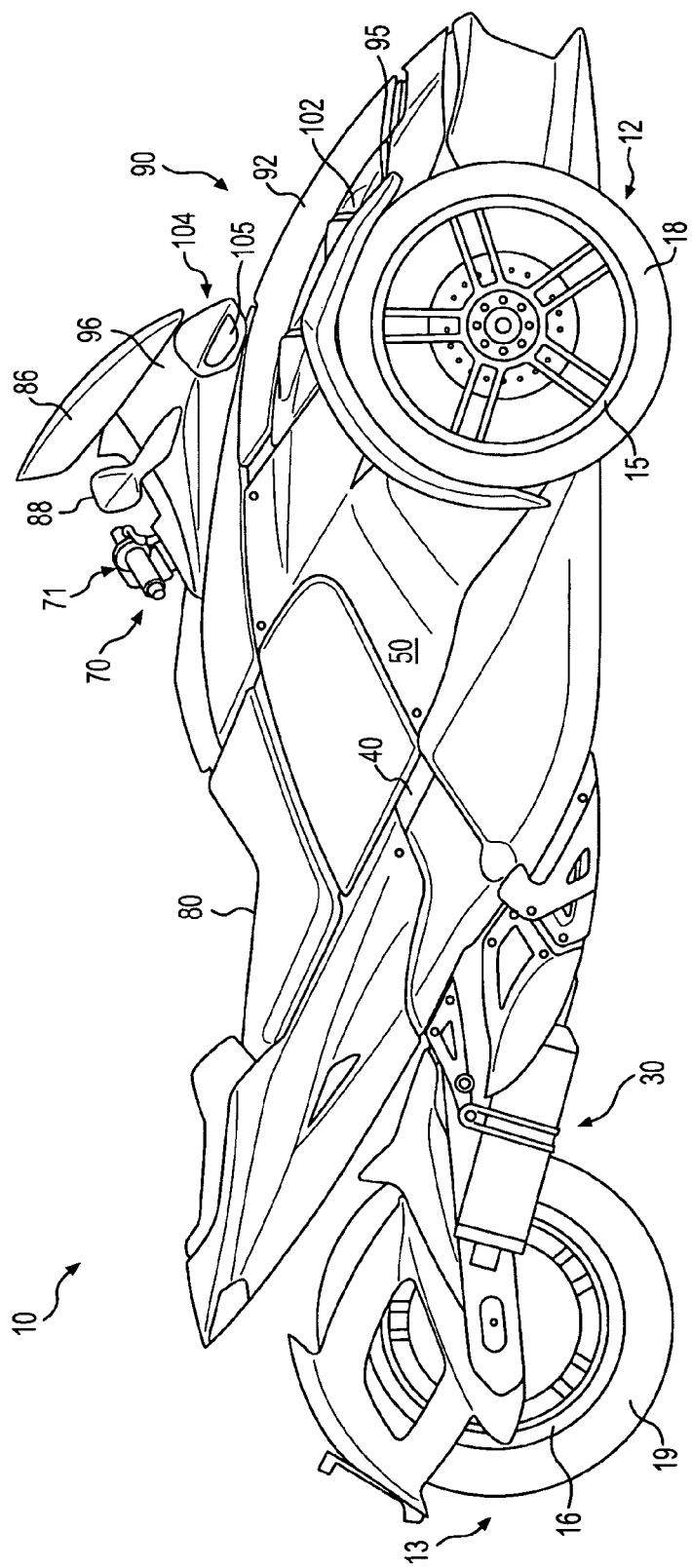
FIG. 5 is a side view of the vehicle of FIG. 2.

As shown in FIGS. 3 and 5, the seat assembly 80 is mounted to the frame assembly 40 between the front wheels 11, 12 and the rear wheel 13. The seat assembly 80 illustrated is preferably cushioned and designed to accommodate a single rider, in particular, the operator. However, as would be appreciated by those skilled in the art, it is possible to configure the seat 80 (and, accordingly, the vehicle 10) to accommodate two or more persons. The present invention is intended to encompass a three-wheeled vehicle of the type shown and described, regardless of the number of riders it is designed to accommodate.

The body 90 is connected to the frame 40 such that it protects the engine 50 and other vehicle 10 components. The body 90 includes a hood 92 that is pivotally attached to the frame 40 such that the hood 92 protects the engine 50, yet provides access to the engine 50 when the vehicle 10 is not in use. The body 90 may be manufactured from sheet metal, but is preferably formed from plastic or a plastic composite material by known methods.

As shown in FIG. 1, the hood 92 is centrally mounted to the front portion of the frame 40 along the longitudinal centerline of the vehicle 10 such that it generally faces forward when the vehicle 10 moves in the forward direction. A pair of side openings including a left opening 94 and a right opening 95 are provided for in the body 90. The pair of side openings 94, 95 are disposed on either side of the hood 92 and also generally face forward. The pair of side openings 94, 95 are constructed to receive the plurality of utility modules 100 that are specifically designed to be received by each opening 94, 95, as will be further explained below. It is contemplated that the pair of side openings 94, 95 may be recessed compartments within the body 90 or may be apertures in the body 90. As will be explained below, the openings 94, 95 should provide a connection to both the electrical system and the engine 50. Also, the precise location of the openings 94, 95 are determined, in part, by the European Community Directive attached in the Appendix.

The body 90 also includes a fairing 96 that extends upward from the hood 92, as shown in FIGS. 1-6. As shown in the figures, additional vehicle components, such as a windshield 86 and a pair of mirrors 88 may be attached to the fairing 96. As shown in the figures, the handlebars 71 may while the fairing 96 remains in a fixed position. It is also contemplated that the fairing 96 may be attached to the steering assembly 70 such that the fairing 96 moves when the handle bars 71 move.

As shown in FIG. 1, the hood 92 is centrally mounted to the front portion of the frame 40 along the longitudinal centerline of the vehicle 10 such that it generally faces forward when the vehicle 10 moves in the forward direction. A pair of side openings including a left opening 94 and a right opening 95 are provided for in the body 90. The pair of side openings 94, 95 are disposed on either side of the hood 92 and also generally face forward. The pair of side openings 94, 95 are constructed to receive the plurality of utility modules that are specifically designed to be received by each opening 94, 95, as will be further explained below. It is contemplated that the pair of side openings 94, 95 may be recessed compartments within the body 90 or may be apertures in the body 90. As will be explained below, the openings 94, 95 should provide a connection to both the electrical system and the engine 50. Also, the precise location of the openings 94, 95 are determined, in part, by the European Community Directive attached in the Appendix.

In the present invention, the plurality of utility modules 100 includes a headlight module 102, an air intake module 104, and a fairing module 106, the fairing module 106 being mainly an aesthetic surface it could be connected to the vehicle using hinges and latches. The fairing module mounted on hinges and latch can be opened and gives access to a storage compartment underneath. A locking mechanism can secure the fairing module to prevent the content of the storage compartment to be stolen. The headlight module 102 preferably includes at least one main-beam, or high beam, headlamp 108, and at least one dipped-beam, or low beam, headlamp 110, although other combinations of lamps may be used and are considered within the scope of the invention. The utility modules 100 may each include a plastic material.

The fairing 96 includes a central opening 98 that is centered on the longitudinal centerline of the vehicle 10 and is preferably disposed generally horizontally, as shown in FIGS. 1 and 2. The central opening 98 is constructed to receive the plurality utility modules that are specifically designed to fit into the central opening 98. The central opening 98 may be a recessed compartment or may be an aperture in the fairing 96. The central opening 98 should provide a connection to both the electrical system and the engine 50. Also, the precise location of the central opening 98 is determined, in part, by the United States regulations attached in the Appendix.

In the present invention, the plurality of utility modules includes a headlight module 102 and an air intake module 104. The headlight module 102 preferably includes at least one main-beam, or high beam, headlamp 108, and at least one dipped-beam, or low beam, headlamp 110, although other combinations of lamps may be used and are considered within the scope of the invention. The utility modules may each include a plastic material.

In another embodiment, the headlight modules 102 are configured to be attached to the fender assembly 60 such that one headlight module 102 is disposed over the left wheel 11 and one headlight module is disposed over the right wheel 12.

Commonly owned and pending U.S. patent application Ser. No. 10/371,228 describing a fender assembly and lighting system is incorporated herein by reference.

Besides housing the headlamps 108, 110 and other lighting elements, such as flashers, the headlight modules 102 may include the components necessary to provide electrical power to the headlamps 108, 110, as well as the proper sealing components to protect any electrical components from water, dirt, and other foreign elements. Specifically, the back side of the headlight module 102 should include an electrical connector so that when the headlight module 102 is inserted into the appropriate opening 94, 95, 98, electrical power may be provided to the headlight module 102 from the vehicle 10. Although self-contained headlamps may be used within the headlight module 102, it is contemplated that the headlight module 102 itself may be a self-contained headlamp with at least one reflector and at least one light bulb.

As shown in FIG. 1, the air intake modules 104 for the pair of side openings 94, 95 each include at least one opening 105 so that air may pass through the air intake module 104 and the body 90 so that air may be communicated to the engine 50. An air intake pipe (not shown) may be installed such that it attaches to the air intake module 104 and fluidly communicates air from the outside of the vehicle 10 to an air intake box (not shown). Air may then be fluidly communicated from the air intake box to the engine 50. The air intake modules 104 for the side openings 94, 95 should complement each other to provide an aesthetically pleasing appearance. Also, the air intake modules 104 should be designed to be as aerodynamic as possible.

As shown in FIG. 2, the air intake module 104 for the central opening 98 on the fairing 96 includes at least one opening 105. In the illustrated embodiment, the air intake module 104 for the central opening 98 on the fairing 96 includes two openings 105. As explained above, the air intake pipe (not shown) may be installed such that it attaches to the air intake module 104 and fluidly communicates air from the outside of the vehicle 10 to the air intake box. Air may then be fluidly communicated from the air intake box to the engine 50. The air intake module 104 can distribute air from the outside of the vehicle to the engine compartment to ventilate the engine compartment. The air intake module 104 for the central opening 98 should complement the overall design of the vehicle 10 and should be designed to be as aerodynamic as possible.

It is further contemplated that the utility modules 100 may be sold in an after market modular headlight kit. The kit may include any combination and number of the utility modules 100, selected from the group consisting of the headlight module 102, and the air intake module 104, and the fairing module 106. Preferably, at least one headlight module 102 and at least one fairing module 108 are included in the kit. For example, a United States kit may include one headlight module 102 and two air intake modules 104, or one headlight module 102 and two fairing modules 106, or one headlight module 102, two air intake modules 104, and two fairing modules 106. Similarly, a European kit may include two headlight modules 102 and one air intake module 104, or two headlight modules 102 and one fairing module 106, or two headlight modules 102, one air intake module 104, and one fairing module.

As a result of the present invention, one vehicle 10 may be manufactured for use in the United States and in the European Community, even though different regulations govern the placement of headlights on three-wheeled vehicles, thereby significantly reduced the cost of manufacturing the vehicle if the three-wheeled vehicle 10 is to be used in the United States, the corresponding headlight module 102 may be attached to the central opening 98 of the fairing 96 and a pair of air intake modules 104 may be attached to the pair of side openings 94, 95 in the body 90. If the same three-wheeled vehicle 10 is to be used in the European Community, a pair of headlight modules may be attached the pair of side openings 94, 95 in the body 90 of the vehicle 10 and an air intake module 104 may be attached to the central opening 98 of the fairing 96.

It is further contemplated that the utility modules may be sold in an after market modular headlight kit. The kit may include any combination and number of the utility modules, selected from the group consisting of the headlight module 102 and the air intake module 104. Preferably, at least one headlight module 102 and at least one fairing module 108 are included in the kit. For example, a United States kit may include one headlight module 102 and two air intake modules 104. Similarly, a European kit may include two headlight modules 102 and one air intake module 104.

What is claimed is:

1. A three-wheeled vehicle with a modular headlight system comprising:

a frame;

two front wheels including road tires having a pressure of between 138 kPa and 345 kPa, the two front wheels supporting a front portion of the frame;

one rear wheel including at least one road tire, the rear wheel supporting a rear portion of the frame;

an engine mounted on the frame and providing power to at least one of the wheels;

a steering assembly operatively connected to the front wheels, the steering assembly including at least one handle bar;

an electrical system electrically connected to the engine; and a body disposed on the frame, the body including a pair of side openings generally symmetrically disposed on either side of the vehicle, each of the side openings having associated therewith an electrical connection to the electrical system of the vehicle, each of the side openings being configured to receive one of a plurality of modules, each of the plurality of modules being constructed to be received in at least one of the side openings, at least a first one of the plurality of modules being a headlight module electrically connectable to the electrical system of the vehicle via the electrical connection associated with one of the side openings, at least a second one of the plurality of modules not being electrically connectable to the electrical system of the vehicle; and a central opening, the central opening having associated therewith an electrical connection to the electrical system of the vehicle, the central opening being configured to receive a central headlight module electrically connectable to the electrical system of the vehicle via the electrical connection associated with the central opening.

2. The three-wheeled vehicle of claim 1, wherein the second one of the plurality of modules is an air intake opening module having an air intake opening.

3. The three-wheeled vehicle of claim 2, wherein the air intake opening module allows air to pass through the body via the air intake opening when the air intake opening module is received in the corresponding opening.

4. The three-wheeled vehicle of claim 2, wherein each of the pair of side openings receives an air intake opening module therein.

5. The three-wheeled vehicle of claim 4, wherein the center of the central headlight module is located between 559 mm and 1372 mm above the ground.

6. The three-wheeled vehicle of claim 4, wherein the central headlight module comprises at least one high beam headlight and at least one low beam headlight, the high beam headlight being disposed substantially horizontally from the low beam headlight, wherein inner facing edges of the high beam headlight and the low beam headlight are disposed less than 201 mm from each other.

7. The three-wheeled vehicle of claim 1, wherein a pair of headlight modules are received in the pair of side openings.

8. The three-wheeled vehicle of claim 7, wherein innermost edges of the headlight modules are disposed greater than 499 mm apart.

9. The three-wheeled vehicle of claim 7, wherein outermost edges of the headlight modules are disposed less than 401 mm from the outermost edges of the vehicle.

10. The three-wheeled vehicle of claim 7, wherein the headlight modules are located between 500 mm and 1200 mm above the ground.

11. The three-wheeled vehicle of claim 7, wherein each headlight module comprises a high beam headlight and a low beam headlight.

12. The three-wheeled vehicle of claim 7, wherein innermost edges of the headlight modules are disposed greater than 399 mm apart.

13. A modular headlight kit for a three-wheeled vehicle comprising:
a frame;
two front wheels including road tires having a pressure of between 138 kPa and 345 kPa, the two front wheels supporting a front portion of the frame;
one rear wheel including at least one road tire, the rear wheel supporting a rear portion of the frame;
an engine mounted on the frame and providing power to at least one of the wheels;
a steering assembly operatively connected to the front wheels, the steering assembly including at least one handle bar;
an electrical system electrically connected to the engine;
a body disposed on the frame, the body including, a pair of side openings generally symmetrically disposed on either side of the vehicle, each of the side openings having associated therewith an electrical connection to the electrical system of the vehicle, each of the side openings being configured to receive one of a plurality of modules, each module of the plurality of modules being constructed to be received in at least one of the side openings, the kit comprising:
at least one headlight module being one of the plurality of modules constructed to be received in at least one of the side openings, the at least one headlight module being connectable to the electrical system of the vehicle via the electrical connection associated with the side opening; and
at least one air intake module being one of the plurality of modules constructed to be received in at least one of the side openings, the air intake module having an air intake opening.

* * * * *